United States Patent
Emoto et al.

(10) Patent No.: US 9,673,624 B2
(45) Date of Patent: Jun. 6, 2017

(54) POWER SUPPLY DEVICE AND POWER SUPPLY SWITCHING METHOD

(71) Applicant: MITSUBISHI HITACHI POWER SYSTEMS, LTD., Kanagawa (JP)

(72) Inventors: Hideaki Emoto, Tokyo (JP); Mitsuyuki Shirae, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 412 days.

(21) Appl. No.: 14/366,859

(22) PCT Filed: Dec. 25, 2012

(86) PCT No.: PCT/JP2012/083408
§ 371 (c)(1),
(2) Date: Jun. 19, 2014

(87) PCT Pub. No.: WO2013/099837
PCT Pub. Date: Jul. 4, 2013

(65) Prior Publication Data
US 2014/0346882 A1    Nov. 27, 2014

(30) Foreign Application Priority Data

Dec. 28, 2011    (JP) ................................ 2011-290038

(51) Int. Cl.
*H02J 7/00* (2006.01)
*H02J 1/04* (2006.01)
(Continued)

(52) U.S. Cl.
CPC ................ *H02J 1/04* (2013.01); *H02J 1/102* (2013.01); *H02M 7/02* (2013.01); *Y10T 307/62* (2015.04)

(58) Field of Classification Search
CPC ........... H02J 1/04; H02J 1/102; Y10T 307/62; H02M 7/02
(Continued)

(56) References Cited

U.S. PATENT DOCUMENTS

2010/0277000 A1* 11/2010 Humphrey ............... H02J 1/102
307/80
2012/0033450 A1* 2/2012 Shih ................... H02M 3/33561
363/21.01

FOREIGN PATENT DOCUMENTS

EP    0 570 636    11/1993
JP    5-292750    11/1993
(Continued)

OTHER PUBLICATIONS

2nd Office Action issued May 23, 2016 in Korean patent application No. 2014-7016003 (with English translation).
(Continued)

*Primary Examiner* — Jared Fureman
*Assistant Examiner* — Duc M Pham
(74) *Attorney, Agent, or Firm* — Wenderoth, Lind & Ponack, L.L.P.

(57) ABSTRACT

A power supply device (10) includes a plurality of constant current output circuits (14) that can supply power to a load (12). The constant current output circuit (14) includes a pulse generation unit (20) that generates a pulse voltage, and a communication unit (34) that transmits and receives drive information, between the constant current output circuit (14) and the other constant current output circuit (14). When an abnormality occurs in the constant current output circuit (14) supplying power to the load (12) and the constant current output circuit (14) supplying power to the load (12) is switched to the other constant current output circuit (14), the other constant current output circuit (14) drives the pulse generation unit (20) by using the drive information that has (Continued)

been received through the communication unit (34) from the power supply means having supplied power to the load.

4 Claims, 3 Drawing Sheets

(51) Int. Cl.
*H02M 7/02* (2006.01)
*H02J 1/10* (2006.01)

(58) Field of Classification Search
USPC .......................................................... 307/65
See application file for complete search history.

(56) References Cited

FOREIGN PATENT DOCUMENTS

| | | |
|---|---|---|
| JP | 8-1350 | 1/1996 |
| JP | 9-199953 | 7/1997 |
| JP | 2000-324720 | 11/2000 |
| JP | 2001-318721 | 11/2001 |
| JP | 2002-136000 | 5/2002 |
| JP | 2002-199742 | 7/2002 |
| JP | 2004-295892 | 10/2004 |
| JP | 2009-168529 | 7/2009 |
| JP | 2009-168530 | 7/2009 |
| JP | 2009-168531 | 7/2009 |
| JP | 2009-168532 | 7/2009 |
| JP | 2009-168533 | 7/2009 |
| JP | 2011-4503 | 1/2011 |
| KR | 10-2009-0100580 | 9/2009 |

OTHER PUBLICATIONS

Notification of Fulfilling of Registration Formality issued Jun. 28, 2016 in Chinese patent application No. 201280063915.6 (with English translation).

Office Action issued Nov. 25, 2015 in corresponding Korean patent application No. 2014-7016003 (with English translation).

Office Action issued Nov. 27, 2015 in corresponding Chinese patent application No. 201280063915.6 (with English translation).

International Search Report issued Mar. 12, 2013 in International Application No. PCT/JP2012/083408.

Written Opinion of the International Searching Authority issued Mar. 12, 2013 in International Application No. PCT/JP2012/083408.

Decision to Grant a Patent issued Jul. 28, 2015 in corresponding Japanese patent application No. 2011-290038.

Extended European Search Report issued Sep. 7, 2015 in corresponding European patent application No. 12863458.1.

\* cited by examiner

POWER SUPPLY DEVICE AND POWER SUPPLY SWITCHING METHOD

TECHNICAL FIELD

The present invention relates to a power supply device and a power supply switching method.

BACKGROUND ART

A power supply device, which uses a device used at a power plant or the like (an electromagnetic valve, a motor, or the like) as a load and supplies power to the load, (for example, a current output circuit for setting current, which flows in the load, to a prescribed value) is subjected to soundness diagnosis for the improvement of reliability thereof.

As a method of diagnosing soundness, for example, PTL 1 discloses a method including: a step of directly connecting means for generating an AC voltage including a rectangular pulse to the primary side of a transformer or connecting the means to the primary side of the transformer through a rectifying circuit; a step of directly connecting a drive target, which is to be subjected to any one of measurement, drive, and control, to the secondary side of the transformer or connecting the drive target to the secondary side of the transformer through a rectifying circuit; a step of measuring the change of primary-side current, which is caused by current consumption caused by the operation of the drive target connected to the secondary side, by power supplied through the transformer; and a step of diagnosing an operation and a signal state of the drive target by a result of the measurement.

Further, multiple (for example, two) power supply means are provided in a power supply device, and power supply means that supplies power to a load is switched to the other power supply means when abnormality occurs in power supply means that supplies power to the load.

CITATION LIST

Patent Literature

[PTL 1] Japanese Unexamined Patent Application Publication No. 2009-168529

SUMMARY OF INVENTION

Technical Problem

However, when abnormality occurs in power supply means that supplies power to the load and the power supply means that supplies power to the load is switched to the other power supply means, the power supply device should change the output of the other power supply means to a value, which is required by the load, in a shorter period of time.

In particular, when the power supply means is switched, the power supply means including a pulse generation unit, which changes power supplied from a power source into a pulse voltage and supplies the pulse voltage to the load, should change the pulse voltage into a pulse voltage, which corresponds to the load, in a short period of time. However, since power supply means corresponding to a switching destination does not have information about the load, it is difficult for the power supply means to output a pulse voltage, which corresponds to the load, in a short period of time.

The invention has been made in consideration of these circumstances, and an object of the invention is to provide a power supply device and a power supply switching method capable of changing power, which is output from power supply means corresponding to a switching destination, to power, which is required by a load, in a shorter period of time even though power supply means supplying power to the load is switched.

Solution to Problem

In order to achieve the object, a power supply device and a power supply switching method of the invention employ the following means.

A power supply device according to an aspect of the invention includes a plurality of power supply means capable of supplying power to the same load. Power is supplied to the load by one of the power supply means. When abnormality occurs in the power supply means that supplies power to the load, the power supply means supplying power to the load is switched to the other power supply means. The power supply means includes pulse generating means for generating a pulse voltage having a pulse width corresponding to a voltage and current to be output, and transmitting-and-receiving means for transmitting and receiving drive information, which is information required for driving the pulse generating means, between the power supply means and the other power supply means. When abnormality occurs in the power supply means supplying power to the load and the power supply means supplying power to the load is switched to the other power supply means, the other power supply means drives the pulse generating means by using the drive information that has been received through the transmitting-and-receiving means from the power supply means having supplied power to the load.

According to this configuration, the power supply device includes the plurality of power supply means capable of supplying power to the same load, power is supplied to the load by one power supply means, and the power supply means supplying power to the load is switched to the other power supply means when abnormality occurs in the power supply means that supplies power to the load. Accordingly, the delay of the supply of power to the load is prevented.

The power supply means includes pulse generating means for generating a pulse voltage having a pulse width corresponding to a voltage and current to be output.

Here, when switching the power supply means, which supplies power to the load, to the other power supply means, the power supply device should change a pulse voltage, which is output from the other power supply means, to a pulse voltage corresponding to the load, in a short period of time in order to change power, which is output from the other power supply means, to power, which is required by the load, in a shorter period of time.

Further, the power supply device transmits and receives drive information, which is information required for driving the pulse generating means, between the power supply means and the other power supply means by the transmitting-and-receiving means. That is, the power supply means, which supplies power to the load, transmits the drive information to the other power supply means, and the power supply means, which does not supply power to the load, receives the drive information. Furthermore, when abnormality occurs in the power supply means that supplies power to the load and the power supply means supplying power to the load is switched to the other power supply means, the other power supply means drives the pulse generating means by using the drive information that has been received through the transmitting-and-receiving means.

Since the other power supply means having been switched drives the pulse generating means by using the drive information in this configuration as described above, the pulse generating means of the other power supply means can be driven as in the power supply means that has supplied power to the load until then. For this reason, in this configuration, it is possible to change power, which is output from the power supply means corresponding to the switching destination, to power, which is required by the load, in a shorter period of time even though the power supply means supplying power to the load is switched.

Further, in the first aspect, it is preferable that the drive information be a set value of the pulse generating means, the magnitude of a voltage output from the pulse generating means, or a resistance value of the load.

According to this configuration, it is possible to easily change power, which is output from the power supply means corresponding to the switching destination, to power, which is required by the load, in a shorter period of time.

Furthermore, in the first aspect, it is preferable that the drive information be transmitted to the other power supply means through the communication means at a prescribed cycle while one of the power supply means supplies power to the load.

According to this configuration, the drive information is always transmitted to the other power supply means from the power supply means that supplies power to the load. Accordingly, even though abnormality occurs in the power supply means that supplies power to the load, it is possible to more reliably switch the power supply means, which supplies power, to the other power supply means.

Moreover, in the first aspect, it is preferable that the pulse voltage output from the pulse generating means be subjected to feedback control so that current flowing in the load reaches a prescribed value.

According to this configuration, it is possible to more accurately set current, which flows in the load, to a prescribed value.

Further, a power supply switching method according to a second aspect of the invention switches power supply means, which supplies power to the same load, by using a power supply device including a plurality of power supply means. The power supply means includes pulse generating means for generating a pulse voltage having a pulse width corresponding to a voltage and current to be output. The power supply switching method includes: a first step of transmitting drive information, which is information required for driving the pulse generating means, to the other power supply means, which does not supply power to the load, by the power supply means that supplies power to the load; and a second step of driving the pulse generating means by using the drive information, which is transmitted from the power supply means having supplied power to the load, by the other power supply means when abnormality occurs in the power supply means that supplies power to the load and the power supply means supplying power to the load is switched to the other power supply means.

Advantageous Effects of Invention

According to the invention, there is an advantageous effect of changing power, which is output from power supply means corresponding to a switching destination, to power, which is required by a load, in a shorter period of time even though power supply means supplying power to the load is switched.

DESCRIPTION OF EMBODIMENTS

Embodiments of a power supply device and a power supply switching method according to the invention will be described below with reference to the drawings.

Figure 1:
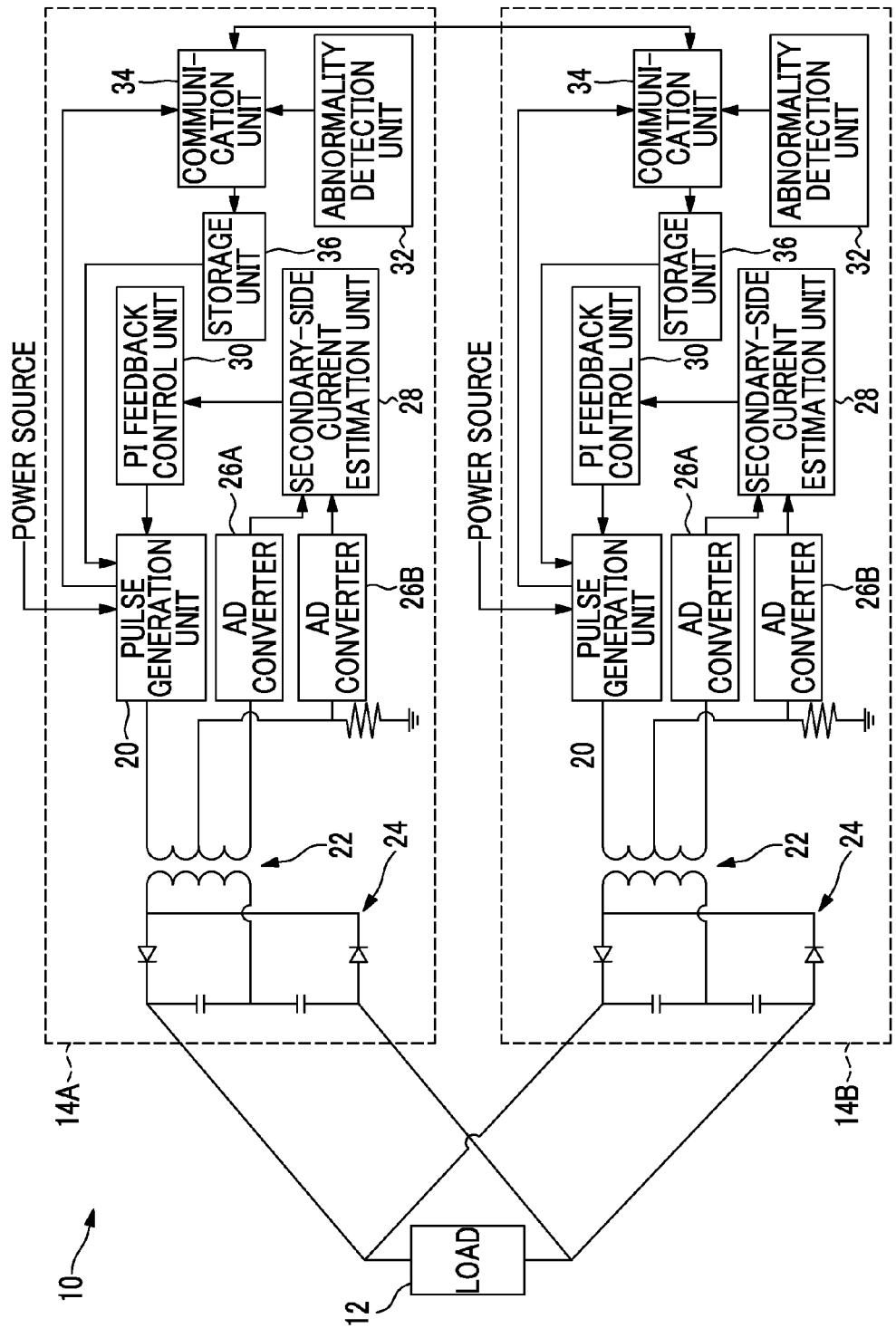
FIG. 1 is a view showing the configuration of a power supply device according to an embodiment of the invention.

FIG. 1 is a block diagram showing the configuration of a power supply device 10 according to this embodiment. The power supply device 10 according to this embodiment is provided at a power plant as an example, and uses a device, which is used at the power plant, (an electromagnetic valve, a motor, or the like) as a load 12. Further, the power supply device 10 includes constant current output circuits 14A and 14B, which allow current having a prescribed value to flow to the load 12, as power supply means capable of supplying power to the load 12. In the following description, either A or B is added to the end of a reference numeral when the respective constant current output circuits 14A and 14B are to be distinguished from each other, and either A or B added to the end of a reference numeral is omitted when the respective constant current output circuits 14A and 14B do not need to be distinguished from each other.

The power supply device 10 supplies power to the load 12 by one constant current output circuit 14. When abnormality occurs in the constant current output circuit that supplies power to the load 12, the power supply device 10 switches the constant current output circuit 14, which supplies power to the load 12, to the other constant current output circuit 14. That is, since the power supply device 10 includes two constant current output circuit 14, the power supply device 10 supplies power to the load 12 by one constant current output circuit 14 and makes the other constant current output circuit 14 be on standby as a standby unit. Meanwhile, the constant current output circuit 14 serving as the standby unit is in a state in which power is applied to the constant current output circuit 14 so that the constant current output circuit 14 can supply power to the load 12 at any time and the constant current output circuit 14 does not supply power (hereinafter, referred to as a "standby state"). Since multiple (two in this embodiment) constant current output circuits 14 are provided as described above, the delay of the supply of power to the load 12 is prevented.

The constant current output circuit 14 includes a pulse generation unit 20, an insulation transformer 22, and a rectifying unit 24.

The pulse generation unit 20 is connected to the primary side of the insulation transformer 22, is supplied with power from a power source, and generates a pulse voltage having a pulse width corresponding to a voltage and current to be output. That is, the constant current output circuit 14 changes current, which is allowed to flow to the load 12, to constant current by the pulse width modulation (PWM) that is performed by the pulse generation unit 20. A pulse voltage, which is generated by the pulse generation unit 20, is an AC voltage that is formed of a rectangular wave or a sine wave. Meanwhile, the standby state in which the above-mentioned constant current output circuit 14 does not supply power to the load 12 means a state in which at least the pulse generation unit 20 is not driven.

The rectifying unit 24 is connected to the secondary side of the insulation transformer 22, and rectifies a voltage, which is output from the insulation transformer 22, by a diode and a capacitor, and applies the rectified voltage to the load 12.

Further, the constant current output circuit 14 includes AD converters 26A and 26B, a secondary-side current estimation unit 28, and a proportional-integral (PI) feedback control unit 30.

The AD converter 26A converts a voltage value, which is output from the pulse generation unit 20, into a digital value (voltage value) (hereinafter, referred to as "AD conversion (analog-digital conversion)", and outputs the digital value to the secondary-side current estimation unit 28.

The AD converter 26B converts a primary-side current value into a digital value (voltage value) (AD conversion), and outputs the digital value to the secondary-side current estimation unit 28.

The secondary-side current estimation unit 28 estimates a value of current, which flows in the secondary side, that is, the load 12, (hereinafter, referred to as "load current".) on the basis of the voltage value that is input from the AD converter 26A and the voltage value that is input from the AD converter 26B, and outputs the estimated value to the PI feedback control unit 30.

The PI feedback control unit 30 performs feedback control on the pulse voltage, which is output from the pulse generation unit 20, so that the current flowing in the load 12 reaches a prescribed value (required current value). Specifically, the PI feedback control unit 30 determines a pulse width of a pulse voltage, which is a set value of the pulse generation unit 20 (hereinafter, referred to as a "PWM set value"), by PI control (proportional-integral control) that is based on the estimated value input from the secondary-side current estimation unit 28 and the required current value, and outputs the pulse width to the pulse generation unit 20. For this reason, the pulse generation unit 20 outputs a pulse voltage with the pulse width that is input from the PI feedback control unit 30. Accordingly, it is possible to more accurately set the load current to a prescribed value.

Further, the constant current output circuit 14 includes an abnormality detection unit 32 that detects whether or not abnormality has occurred in the constant current output circuit 14. The abnormality of the constant current output circuit 14 means, for example, a case in which current outside a predetermined range continues to flow to the load 12. When the occurrence of abnormality in the constant current output circuit 14 is detected by the abnormality detection unit 32, the constant current output circuit 14 that supplies power to the load 12 stops supplying power to the load 12. Furthermore, the abnormality detection unit 32 outputs an abnormality detection signal in accordance with the detection of abnormality. The abnormality detection signal is transmitted to the other constant current output circuit 14, which is in the standby state, through a communication unit 34.

In addition, the constant current output circuit 14 that supplies power to the load 12 transmits drive information, which is information required for driving the pulse generation unit 20, to the other constant current output circuit 14, which is in the standby state, through the communication unit 34.

Meanwhile, since the pulse generation unit 20 of the constant current output circuit 14 that supplies power to the load 12 is driven by feedback control, the drive information according to this embodiment is a changing value. In this embodiment, the drive information is referred to as a PWM set value.

The drive information, which is received through the communication unit 34, is stored in a storage unit 36.

Further, when the other constant current output circuit 14, which is in the standby state, receives the abnormality detection signal, the constant current output circuit 14 having received the abnormality detection signal starts to drive the pulse generation unit 20. Accordingly, a source of supply of power to the load 12 is switched to the other constant current output circuit 14 that is in the standby state.

As described above, the constant current output circuit 14 according to this embodiment sets the load current to a prescribed value by feedback control. For this reason, when switching the constant current output circuit 14, which supplies power to the load 12, to the other constant current output circuit 14 that is in the standby state, the power supply device 10 should change a pulse voltage, which is output from the constant current output circuit 14 corresponding to a switching destination, to a pulse voltage corresponding to the load 12, in a short period of time in order to change power, which is output from the constant current output circuit 14 corresponding to the switching destination, to power, which is required by the load 12, in a shorter period of time.

Further, when abnormality occurs in the constant current output circuit 14 that supplies power to the load and the power supply device 10 according to this embodiment switches the constant current output circuit 14, which supplies power to the load 12, to the other constant current output circuit 14, the other constant current output circuit 14, which is the switching destination, drives the pulse generation unit 20 by using the drive information that has been received through the communication unit 34.

Figure 2:
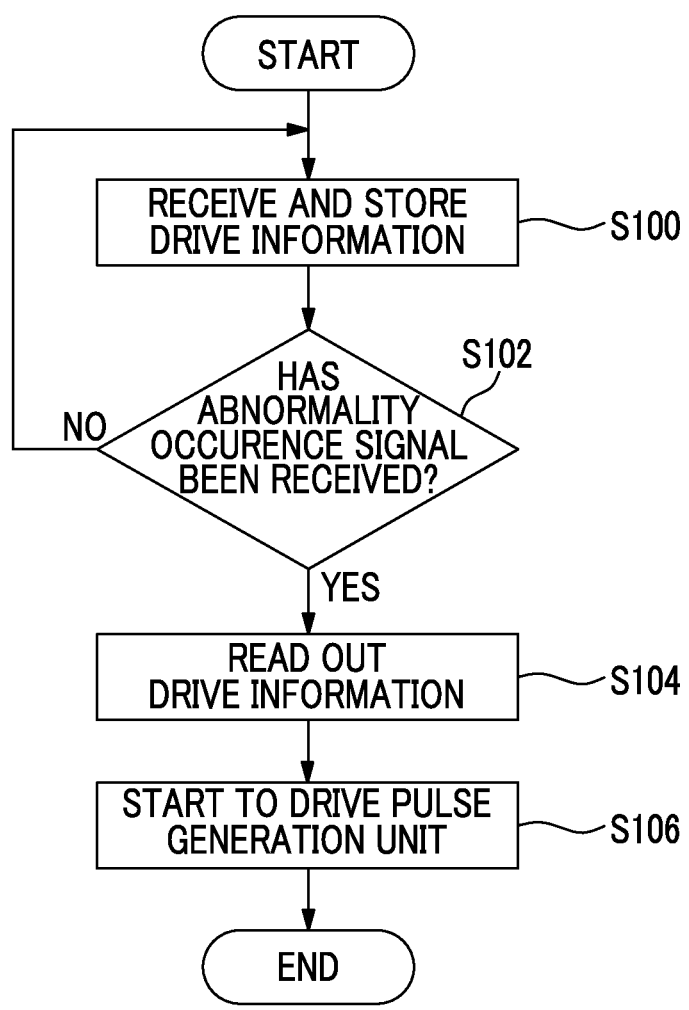
FIG. 2 is a flowchart illustrating a flow of power supply switching processing according to the embodiment of the invention.

Next, the operation of the power supply device 10 according to this embodiment will be described in detail by using a flowchart illustrating a flow of power supply switching processing according to this embodiment shown in FIG. 2. Meanwhile, the flowchart shown in FIG. 2 is a flowchart illustrating the operation of the constant current output circuit 14B when the constant current output circuit 14A supplies power to the load 12 and the constant current output circuit 14B is in the standby state.

In Step 100, the drive information, which is transmitted from the constant current output circuit 14A supplying power to the load 12, is received through the communication unit 34. Further, the received drive information is successively updated and stored in the storage unit 36. That is, while the constant current output circuit 14A supplies power to the load 12, the drive information is transmitted to the constant current output circuit 14B through the communication unit 34 at a prescribed cycle. Meanwhile, the prescribed cycle is the same as a cycle at which, for example, the pulse generation unit 20 outputs a pulse voltage.

In the next step 102, it is determined whether or not the abnormality detection signal has been received from the constant current output circuit 14A through the communication unit 34. If the abnormality detection signal has been received, the processing proceeds to Step 104. If the abnormality detection signal has not been received, the receipt and storage of the drive information performed in Step 100 are repeated. Meanwhile, the determination of whether or not the abnormality detection signal has been received is performed by, for example, an arithmetic unit provided in the communication unit 34, and a result of the determination representing the receipt of the abnormality detection signal is output to the AD converters 26A and 26B, the secondary-side current estimation unit 28, and the PI feedback control unit 30 from the communication unit 34. When the abnormality detection unit 32 of the constant current output circuit 14A detects abnormality, the supply of power to the load 12 from the constant current output circuit 14A is stopped.

In Step 104, up-to-date drive information is read out from the storage unit 36 of the constant current output circuit 14B and is output to the pulse generation unit 20.

In the next step 106, the pulse generation unit 20 starts to output a pulse voltage by using the PWM set value, which is represented by the drive information, and the pulse generation unit 20 is subjected to feedback control. Meanwhile, the AD converters 26A and 26B, the secondary-side current estimation unit 28, and the PI feedback control unit 30 start respective kinds of processing required for feedback control by using the result of determination, which is output from the communication unit 34 in Step 102, as a trigger. Accordingly, the supply of power to the load 12 from the constant current output circuit 14B is started.

As described above, the power supply device 10 according to this embodiment includes the plurality of constant current output circuits 14 that can supply power to the load 12, and supplies power to the load 12 by one constant current output circuit 14. When abnormality occurs in the constant current output circuit 14 that supplies power to the load 12, the power supply device 10 switches the constant current output circuit 14, which supplies power to the load 12, to the other constant current output circuit 14. The constant current output circuit 14 includes the pulse generation unit 20 that generates a pulse voltage having a pulse width corresponding to a voltage and current to be output, and the communication unit 34 that transmits and receives drive information, which is information required for driving the pulse generation unit 20, between the constant current output circuit 14 and the other constant current output circuit 14. Further, when abnormality occurs in the constant current output circuit 14 that supplies power to the load 12 and the constant current output circuit 14 supplying power to the load 12 is switched to the other constant current output circuit 14, the other constant current output circuit 14 drives the pulse generation unit 20 by using the drive information that has been received through the communication unit 34.

Since the switched constant current output circuit of the power supply device 10 according to this embodiment drives the pulse generation unit 20 by using the drive information as described above, the pulse generation unit 20 of the constant current output circuit corresponding to the switching destination can be driven as in the constant current output circuit 14 that has supplied power to the load 12 until then. For this reason, the power supply device 10 according to this embodiment can change power, which is output from the constant current output circuit 14 corresponding to the switching destination, to power, which is required by the load 12, in a shorter period of time even though the constant current output circuit 14 supplying power to the load 12 is switched.

The invention has been described using the above-mentioned embodiment. However, the technical scope of the invention is not limited to the description of the above-mentioned embodiment, and the above-mentioned embodiment may have various changes or modifications without departing from the scope of the invention, and embodiments including the changes or the modifications are also included in the technical scope of the invention.

For example, a case in which the PWM set value is used as the drive information has been described in the above-mentioned embodiment. However, the invention is not limited thereto, and may include an embodiment in which the magnitude of a voltage output from the pulse generation unit 20 (hereinafter, referred to as a "load resistance value") or a resistance value of the load 12 (hereinafter, referred to as a "load resistance value") is used as the drive information. The load resistance value is calculated on the basis of load current that is estimated by the secondary-side current estimation unit 28.

Figure 3:
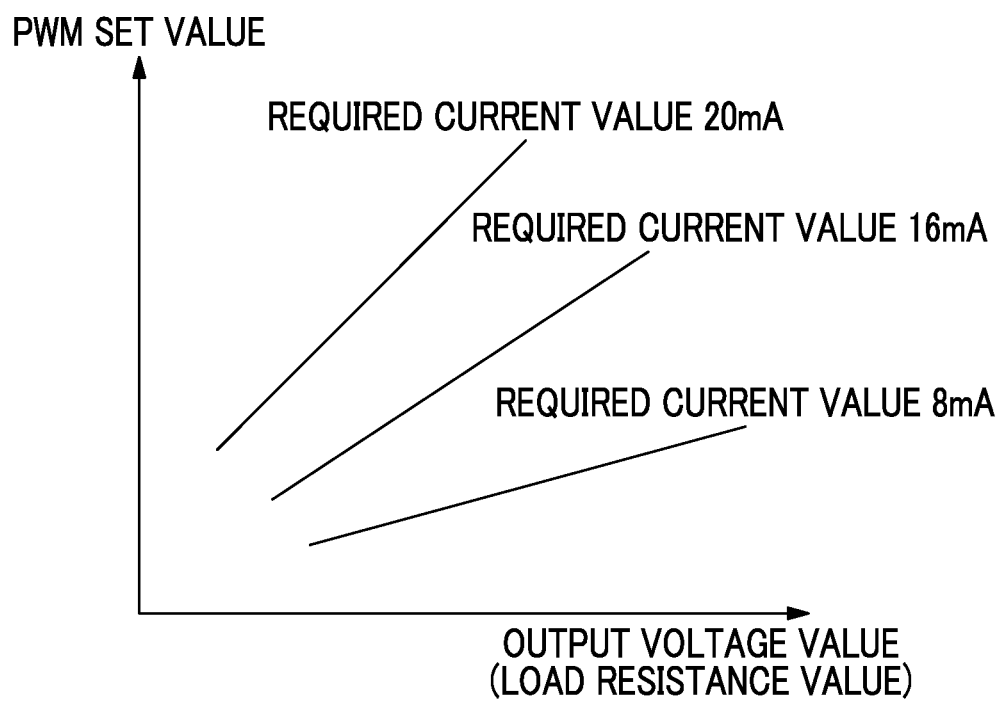
FIG. 3 is a graph showing a relationship between a PWM set value and an output voltage value or a load resistance value according to another embodiment of the invention.

FIG. 3 is a graph showing a relationship between the PWM set value and an output voltage value or a load resistance value.

As shown in FIG. 3, the PWM set value is obtained from an output voltage value or the load resistance value according to a required value of current flowing to the load 12. For this reason, the constant current output circuit 14 shown in FIG. 3 includes an arithmetic section that stores table data in advance and calculates the PWM set value on the basis of the output voltage value or the load resistance value input as the drive information. When the constant current output circuit 14 is switched, the pulse generation unit 20 is driven using the PWM set value that is calculated by the arithmetic section.

Further, a case in which the power supply device 10 includes two constant current output circuits 14 has been described in the above-mentioned embodiment. However, the invention is not limited thereto, and may include an embodiment in which the power supply device may include three or more constant current output circuits 14. In the case of this embodiment, one constant current output circuit 14 supplies power to the load 12, and a plurality of the other constant current output circuits 14 are in a standby state. Further, when abnormality occurs in the one constant current output circuit 14 that supplies power to the load 12, the constant current output circuit 14 supplying power to the load 12 is switched to one constant current output circuit 14 of the plurality of the other constant current output circuits 14 are in the standby state.

Furthermore, a case in which the abnormality detection unit 32 outputs the abnormality detection signal when detecting abnormality has been described in the above-mentioned embodiment. However, the invention is not limited thereto, and may include an embodiment in which the abnormality detection unit 32 outputs a normal signal representing that abnormality does not occur when not detecting abnormality and stops outputting the normal signal when detecting abnormality. In the case of this embodiment, when the constant current output circuit 14 that is in the standby state does not receive the normal signal from the constant current output circuit 14 that supplies power to the load 12, the constant current output circuit 14 that supplies power to the load 12 is switched to the constant current output circuit 14 that is in the standby state.

Moreover, a case in which the drive information is transmitted to the constant current output circuit 14, which is in the standby state, at a prescribed cycle while the constant current output circuit 14 supplies power to the load 12 has been described in the above-mentioned embodiment. However, the invention is not limited thereto, and may include an embodiment in which the drive information is not transmitted to the constant current output circuit 14, which is in the standby state, at a prescribed cycle and the drive information is transmitted to the constant current output circuit 14, which is in the standby state, together with the abnormality detection signal when abnormality is detected by the abnormality detection unit 32.

Further, a case in which the pulse generation unit 20 is subjected to feedback control so that load current reaches a prescribed value has been described in the above-mentioned embodiment. However, the invention is not limited thereto, and may include an embodiment in which the pulse generation unit 20 is not subjected to feedback control or is subjected to other control together with feedback control.

Moreover, a case in which current flowing in the load 12 is estimated on the basis of the current flowing on the primary side and feedback control is performed for the pulse generation unit 20 on the basis of the result of the estimation has been described in the above-mentioned embodiment. However, the invention is not limited thereto, and may include an embodiment in which current flowing in the load 12 is directly detected and feedback control is performed for the pulse generation unit 20 on the basis of a result of the detection.

REFERENCE SIGNS LIST

10: power supply device
12: load
14A, 14B: constant current output circuit
20: pulse generation unit
34: communication unit

The invention claimed is:

1. A power supply device comprising:
   a plurality of power supply means' capable of supplying power to a same load,
   wherein power is supplied to the load by one of the plurality of power supply means',
   when an abnormality occurs in a first of the plurality of power supply means' that supplies power to the load, the first power supply means supplying power to the load is configured to switch to a second of the plurality of power supply means',
   each of the plurality of power supply means' includes pulse generating means configured to generate a pulse voltage having a pulse width corresponding to a voltage and a current to be output and configured to change the current flowing to the load into a constant current by pulse width modulation, and
   transmitting-and-receiving means configured to transmit and receive drive information, which is information required for driving the pulse generating means, between the first power supply means and the second power supply means, and
   when the abnormality occurs in the first power supply means supplying power to the load and the first power supply means supplying power to the load is switched to the second power supply means, the second power supply means is configured to drive the pulse generating means by using the drive information that has been received through the transmitting-and-receiving means from the first power supply means having supplied power to the load,
   wherein the drive information is the pulse width of the pulse voltage.

2. The power supply device according to claim 1,
   wherein the drive information is transmitted to the other of the plurality of power supply means' through the transmitting-and-receiving means at a prescribed cycle while one of the plurality of power supply means' supplies power to the load.

3. The power supply device according to claim 1,
   wherein the pulse voltage output from the pulse generating means is subjected to feedback control so that current flowing in the load reaches a prescribed value.

4. A power supply switching method of switching power supply means, which supplies power to the same load, by using a power supply device including a plurality of power supply means', each of the plurality of power supply means' including pulse generating means configured to generate a pulse voltage having a pulse width corresponding to a voltage and a current to be output and configured to change the current flowing to the load into a constant current by pulse width modulation, the power supply switching method comprising:
   a first step of transmitting drive information, which is information required for driving the pulse generating means, to a second of the plurality of power supply means' which does not supply power to the load, by a first of the plurality of power supply means' that supplies power to the load; and
   a second step of driving the pulse generating means by using the drive information, which is transmitted from the first of the plurality of power supply means' having supplied power to the load, by the second of the plurality of power supply means' when an abnormality occurs in the power supply means that supplies power to the load and the power supply means supplying power to the load is switched to another of the plurality of power supply means',
   wherein the drive information is the pulse width of the pulse voltage.

* * * * *